(12) United States Patent
Charroux

(10) Patent No.: US 10,896,174 B2
(45) Date of Patent: Jan. 19, 2021

(54) SHARING ARTIFACTS WITH HETEROGENEOUS DATABASE CONNECTIVITY

(71) Applicant: Business Objects Software Limited, Dublin (IE)

(72) Inventor: Alain Charroux, Paris (FR)

(73) Assignee: Business Objects Software Limited, Dublin (IE)

( * ) Notice: Subject to any disclaimer, the term of this patent is extended or adjusted under 35 U.S.C. 154(b) by 468 days.

(21) Appl. No.: 15/829,163

(22) Filed: Dec. 1, 2017

(65) Prior Publication Data

US 2019/0171741 A1 Jun. 6, 2019

(51) Int. Cl.
*G06F 16/25* (2019.01)
*G06F 16/242* (2019.01)
*G06F 16/21* (2019.01)
*G06F 16/2452* (2019.01)

(52) U.S. Cl.
CPC .......... *G06F 16/2433* (2019.01); *G06F 16/21* (2019.01); *G06F 16/2452* (2019.01); *G06F 16/252* (2019.01)

(58) Field of Classification Search
CPC .. G06F 16/21; G06F 16/2433; G06F 16/2452; G06F 16/252
See application file for complete search history.

(56) References Cited

U.S. PATENT DOCUMENTS

| | | | | |
|---|---|---|---|---|
| 7,349,900 B1* | 3/2008 | Qin | .......................... | G06F 16/25 |
| 7,756,139 B2* | 7/2010 | Choi | .................. | H04L 29/06027 |
| | | | | 370/352 |
| 10,025,599 B1* | 7/2018 | Goodson | .................. | G06F 9/541 |
| 2008/0300962 A1* | 12/2008 | Cawston | ................ | G06Q 10/10 |
| | | | | 705/7.13 |
| 2012/0054341 A1* | 3/2012 | Donaghey | ................ | H04Q 9/00 |
| | | | | 709/224 |
| 2013/0086094 A1* | 4/2013 | Lundberg | ............ | G06F 16/2455 |
| | | | | 707/758 |
| 2013/0179542 A1* | 7/2013 | Wang | ...................... | H04L 67/06 |
| | | | | 709/219 |

* cited by examiner

*Primary Examiner* — Robert W Beausoliel, Jr.
*Assistant Examiner* — Nirav K Khakhar
(74) *Attorney, Agent, or Firm* — Buckley, Maschoff & Talwalkar LLC

(57) ABSTRACT

According to some embodiments, an abstraction engine may determine a data manipulation definition generated by a creator platform to accesses a database via a first connection protocol (e.g., ODBC). The abstraction engine may then automatically analyze the data manipulation definition to discover a connectivity parameter (e.g., a DSN, a DBMS type, a DBMS host name, a port, etc.) associated with the access to the database via the first connection protocol. The data manipulation definition may then be stored along with the connectivity parameter as a meta-connection into a metadata repository. A consuming platform may retrieve the meta-connection from the metadata repository translate the meta-connection into the database manipulation definition to accesses the database via a second connection protocol (e.g., JDBC).

15 Claims, 13 Drawing Sheets

SHARING ARTIFACTS WITH HETEROGENEOUS DATABASE CONNECTIVITY

FIELD

Some embodiments are associated with access information in databases. In particular, some embodiments facilitate artifact sharing with heterogeneous database connectivity.

BACKGROUND

In some cases, a user might want to retrieve business information about an enterprise from a database. For example, a user might want to create a query to view and/or analyze information from an enterprise data store about the enterprise's revenue or profit in accordance with various regions, time periods, products, etc. Query languages, such as the Structured Query Language ("SQL"), may be particularly suited for retrieval of data from data stores, regardless of the schema of the data. A user may author a data manipulation as a high-level definition of a complex request on a database (e.g., an artifact or manipulation that may be frequently re-used). The data manipulation may be associated with a particular database connectivity technology (e.g., Open Database Connectivity ("ODBC") or Java Database Connectivity ("JDBC")) that will later be translated on-the-fly into SQL. Note, however, that because the data manipulation embeds the required communication information it cannot be used or consumed by software that does not use the same database technology. For example, a data manipulation written for ODBC access cannot be used by software using JDBC technology. Manually re-writing and modifying data manipulations when connectivity parameters change can be a costly, time-consuming, and error prone process.

It may therefore be desirable to provide systems and methods to facilitate artifact sharing with heterogeneous database connectivity in an automated and flexible manner.

SUMMARY OF THE INVENTION

According to some embodiments, systems, methods, apparatus, computer program code and means are provided to facilitate artifact sharing with heterogeneous database connectivity in an automated and flexible manner. In some embodiments, an abstraction engine may determine a data manipulation definition generated by a creator platform to accesses a database via a first connection protocol (e.g., ODBC). The abstraction engine may then automatically analyze the data manipulation definition to discover a connectivity parameter (e.g., a DSN, a DBMS type, a DBMS host name, a port, etc.) associated with the access to the database via the first connection protocol. The data manipulation definition may then be stored along with the connectivity parameter as a meta-connection into a metadata repository. A consuming platform may retrieve the meta-connection from the metadata repository translate the meta-connection into the database manipulation definition to accesses the database via a second connection protocol (e.g., JDBC).

Some embodiments comprise: means for determining, by a computer processor of an abstraction engine, a data manipulation definition generated by a creator platform to accesses a database via a first connection protocol; means for automatically analyzing, by the computer processor, the data manipulation definition to discover a connectivity parameter associated with the access to the database via the first connection protocol; and means for storing the data manipulation definition along with the connectivity parameter as a meta-connection into a metadata repository. Still other embodiments further comprise: means for retrieving, by a consuming platform, the meta-connection from the metadata repository; means for translating, by the consuming platform, the meta-connection into the database manipulation definition to accesses the database via a second connection protocol; and/or means for executing, by the consuming platform, the database manipulation definition.

In some embodiments, a communication device associated with a back-end application computer server exchanges information with remote user devices (e.g., to author and/or use data manipulations). The information may be exchanged, for example, via public and/or proprietary communication networks.

Technical effects of some embodiments of the invention are improved and computerized ways to facilitate artifact sharing with heterogeneous database connectivity in an automated and flexible manner. With these and other advantages and features that will become hereinafter apparent, a more complete understanding of the nature of the invention can be obtained by referring to the following detailed description and to the drawings appended hereto.

DETAILED DESCRIPTION

The following description is provided to enable any person in the art to make and use the described embodiments and sets forth the best mode contemplated for carrying out some embodiments. Various modifications, however, will remain readily apparent to those in the art.

Figure 1:
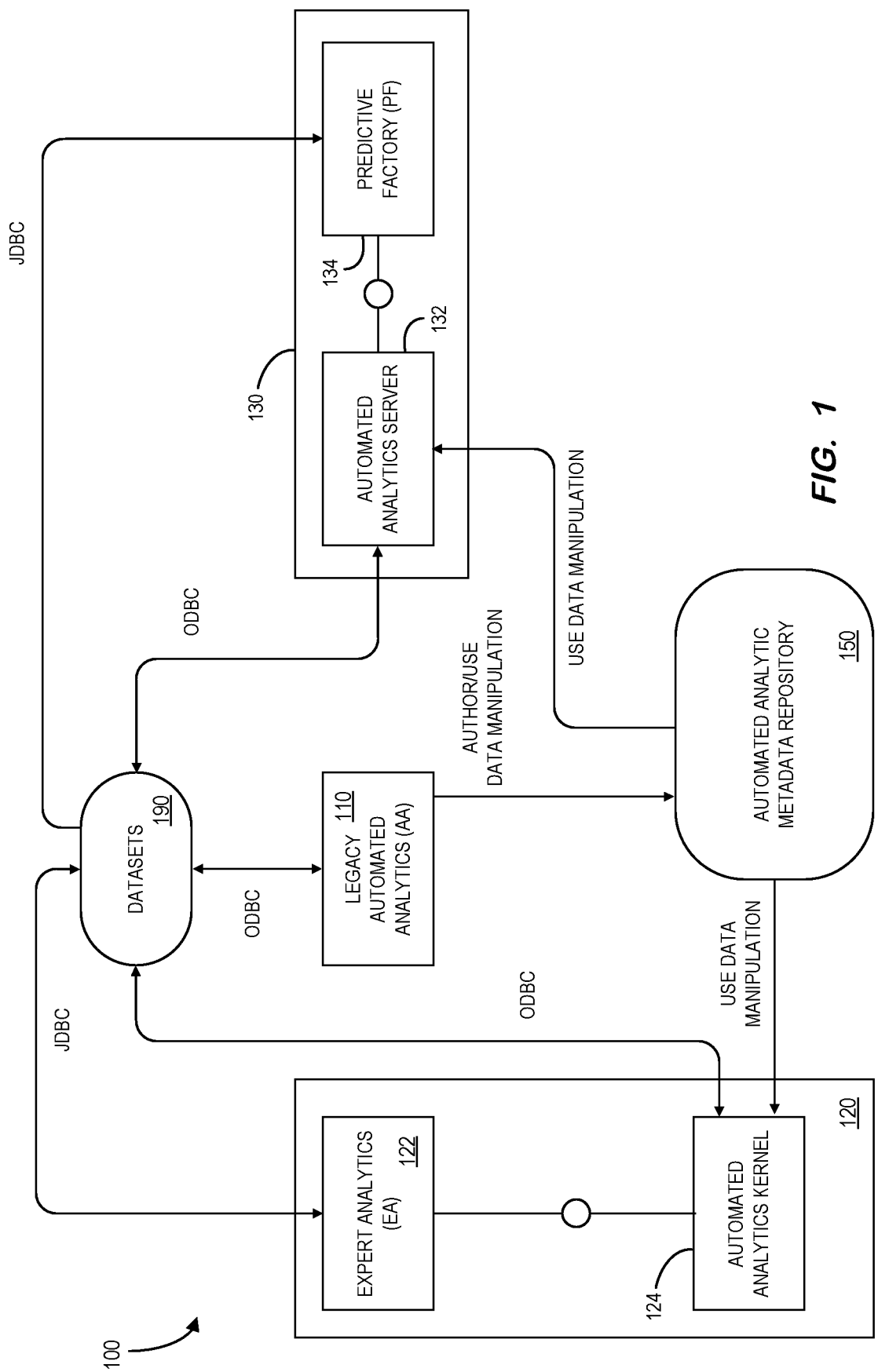
FIG. 1 is a block diagram of a global system.

A user might want to retrieve business information about an enterprise from a database. For example, a user may author a data manipulation as a high-level definition of a complex request on a database (e.g., an artifact) associated with a particular database connectivity technology (e.g., ODBC or JDBC") that will later be translated on-the-fly into SQL. Note, however, that because the data manipulation embeds the required communication information it cannot be used or consumed by software that does not use the same database technology. Consider, for example, FIG. 1 which is a block diagram of a global system 100. In particular, a legacy application associated with automated analytics 110 may author data manipulations that are stored into an automated analytic metadata repository 150. The data manipulations may, for example, utilize ODBC technology to access datasets 190. For example, the ODBC connection may be described only by a logical name (e.g., DataSource-Name) and actual technical connectivity parameters may be hidden.

Figure 2:
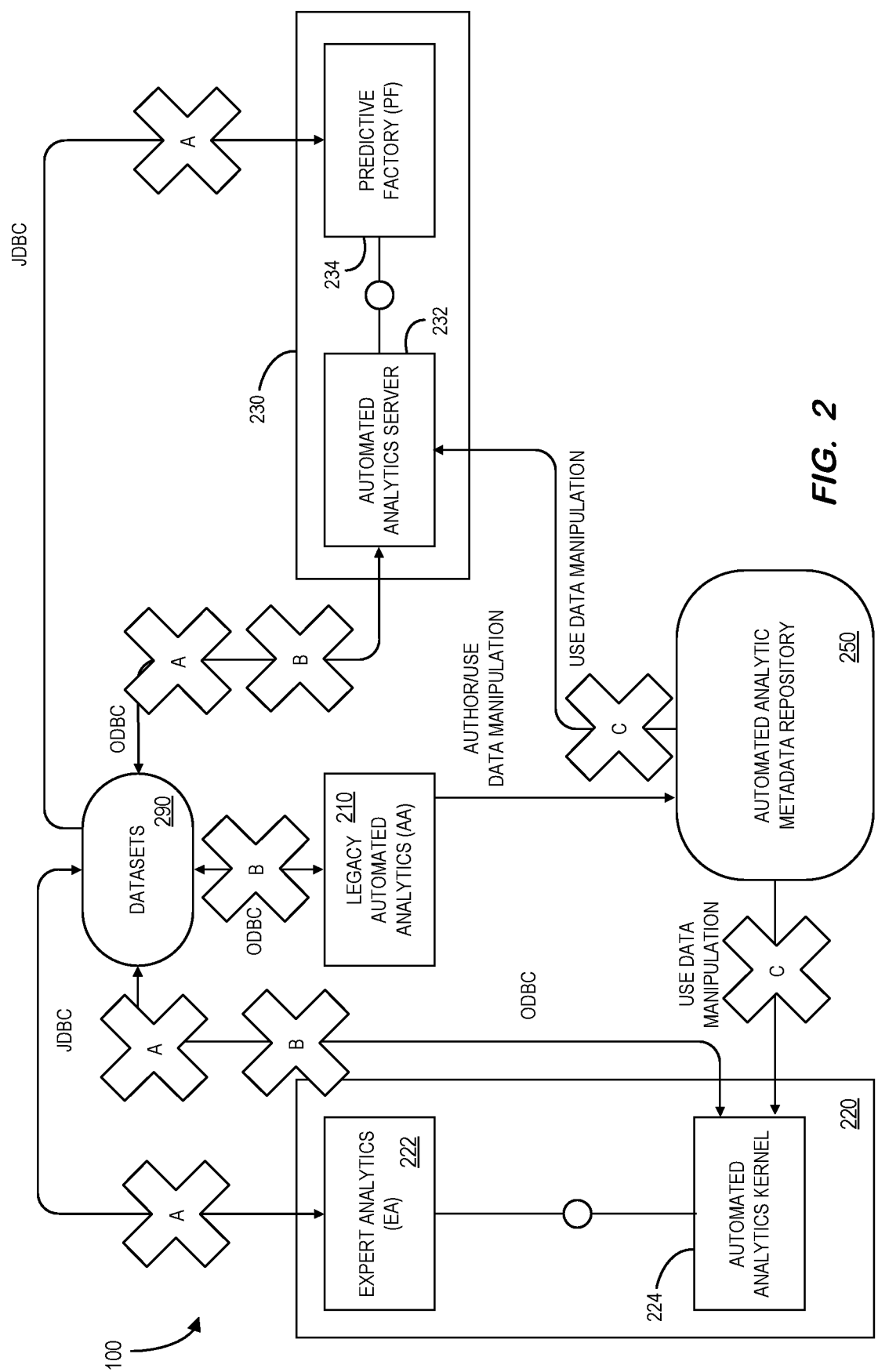
FIG. 2 illustrates potential issues associated with database connectivity.

The system further includes two additional systems 120, 130, one including expert analytics 122 and an automated analytics kernel 124 and the other including an automated analytics server 132 and a predictive factory 134. These additional systems 120, 130 may utilize JDBC technology. For example, the JDBC connection may be described by an explicit and visible set of connectivity parameters. As a result, a data manipulation written for the legacy automated analytics 110 cannot be utilized by the additional systems 120, 130. For example, FIG. 2 illustrates potential issues 200 associated with database connectivity in this situation. As before, a legacy application associated with automated analytics 210 may author data manipulations that are stored into an automated analytic metadata repository 250. The data manipulations may, for example, utilize ODBC technology to access datasets 290 (e.g., the ODBC connection may be described only by a logical name and actual technical connectivity parameters may be hidden) while two additional systems 220, 230 (one including expert analytics 222 and an automated analytics kernel 224 and the other including an automated analytics server 232 and a predictive factory 234) utilize JDBC technology (e.g., the JDBC connection may be described by an explicit and visible set of connectivity parameters). Note that problems (A) might result from the dual definition of connections (as illustrated by an "X" labeled (A) in FIG. 2). In addition, problems (B) might arise because the ODBC Data Source Names ("DSNs") are opaque. Finally, problems (C) may result from the re-use of data manipulations from different connections on the same datasets 290 (e.g., associated with a single Database Management System ("DBMS")

Figure 3:
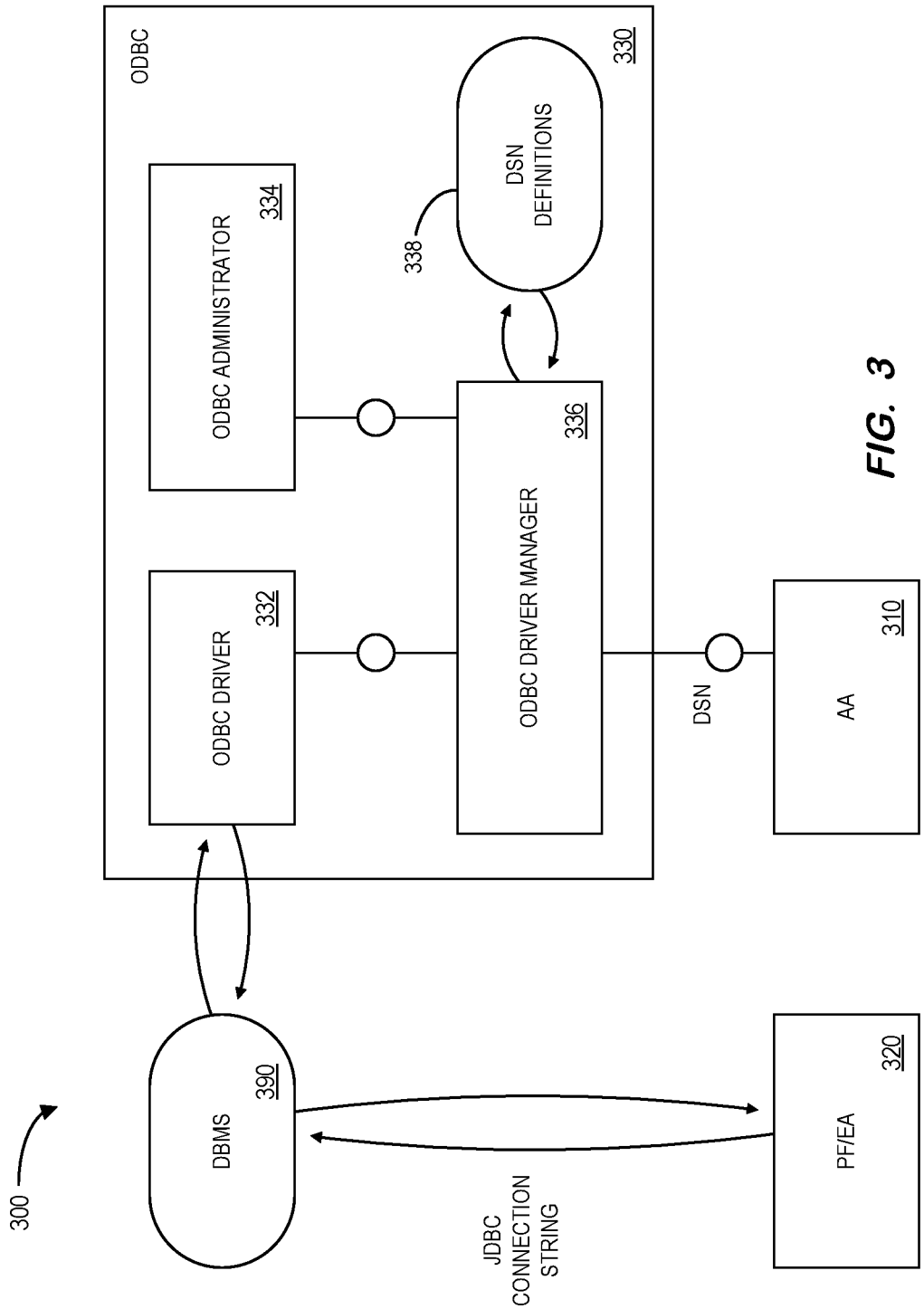
FIG. 3 is a more detailed block diagram of a system associated with open database connectivity and legacy automated analytics.

FIG. 3 is a more detailed block diagram of a system 300 associated with open database connectivity and legacy automated analytics. The system 300 includes automated analytics 310 that access a DBMS 390 via an opaque DSN associated with ODBC 330 (including an ODBC driver 332, an ODBC administrator 334, an ODBC driver manager 336, and DSN definitions 338). Note that the ODBC DSN is not sharable (e.g., using N servers implies to re-define N times the same DSN). Moreover, the ODBC DSN is "opaque," meaning that the set of technical parameters is hidden and the targeted DBMS is "unknown" until an actual connection is established. As a result, it might not be possible to be sure that the same DSN on two different computers actually target the same DBMS.

The system 300 further includes predictive factory and expert analytics 320 that access the same DBMS 390 via a JDBC connection string. According to some embodiments, the duality of connections definition may be addressed via a meta-connection, the opacity of the ODBC DSN may be analyzed to produce a connection that can be matched without DS, and the reuse of a data manipulation from different connections on the same database may be addressed by matching a data manipulation connection with a current connection.

By way of example, a sample JDBC connection string might comprise:
 jdbc:sap://ld9413.wdfsap.corp:30015?autocommit=false
while a sample ODBC connection string might comprise:
 DRIVER={HDBODBC_006};UID=kxenodbc;
  PWD=kxenodbc; SERVER
  NODE=ld9413.wdfsap.corp:30015;
  AUTOCOMMIT=false.

Such as connection string with DNS may be sufficient to specify the whole connection. Idea is to define a connection using a meta-connection string (which may be used in multiple products and translated into the proper technology when needed). According to some embodiments, a meta-connection may be defined only one time in a product, maybe self-sufficient and can be shared, may be compared even while not connected, and a standard ODBC DSN may be introspected so that it can be translated into a meta-connection.

Figure 4:
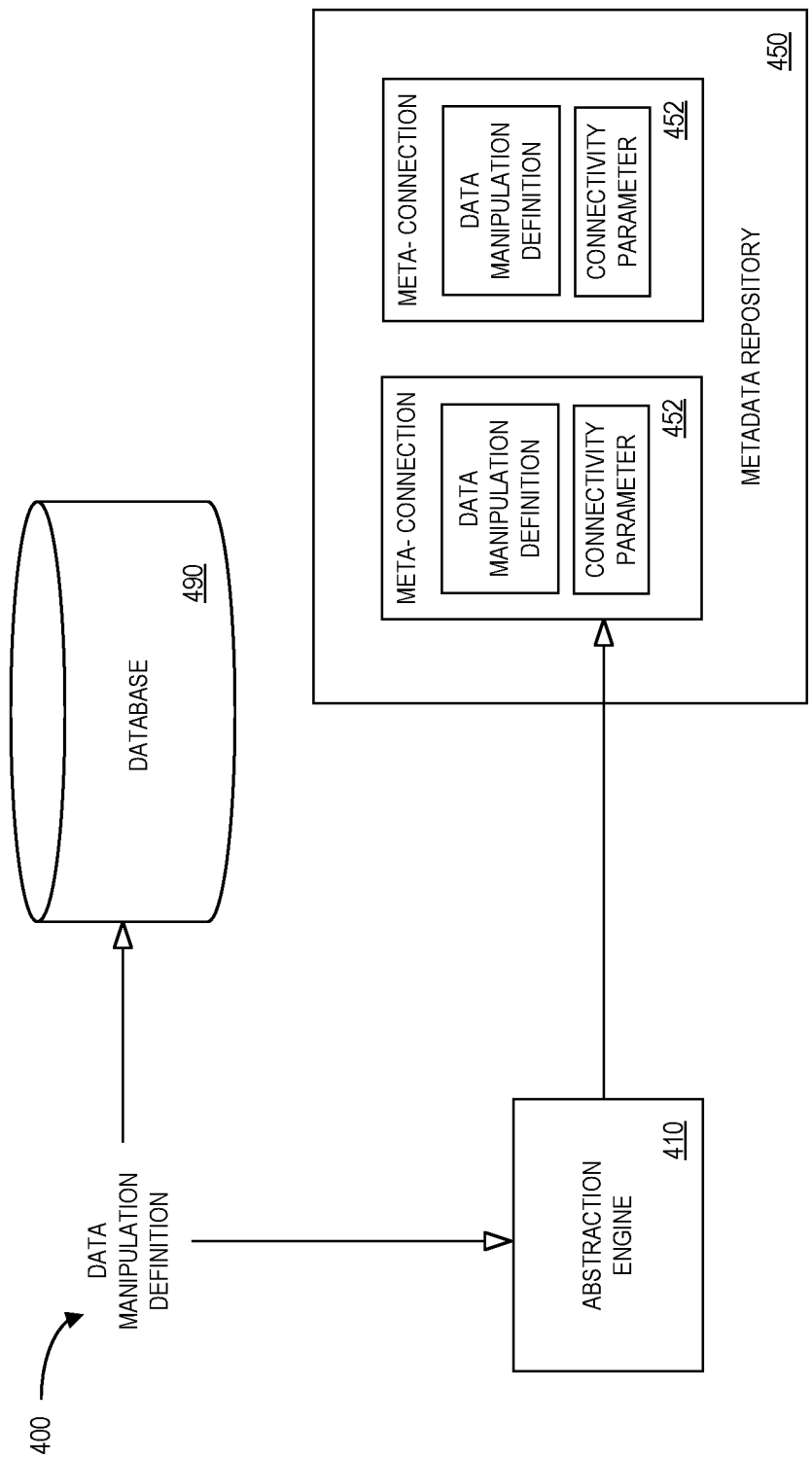
FIG. 4 is a high-level diagram of a system to abstract a data manipulation in accordance with some embodiments.

FIG. 4 is block diagram of a system 400 according to some embodiments of the present invention. In particular, the system 400 includes an abstraction engine 410 that receives information about a data manipulation that accesses a database 490 (e.g., storing enterprise business information). The abstraction engine 410 might be, for example, associated with a Personal Computers ("PC"), laptop computer, an enterprise server, a server farm, and/or a database or similar storage devices.

As used herein, devices, including those associated with the abstraction engine 410 and any other device described herein, may exchange information via any communication network which may be one or more of a telephone network, a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

According to some embodiments, an "automated" abstraction engine 410 may translate the data manipulation definition into a meta-connection 452 stored into a metadata repository 450. Each meta-connection 452 might, for example, include the data manipulation definition along with one or more needed connectivity parameters. As used herein, the term "automated" may refer to, for example, actions that can be performed with little or no human intervention.

The abstraction engine 410 may store information into and/or retrieve information from the database 490 and/or metadata repository 450. The database 490 and repository 250 may be a locally stored relational database or reside remote from the abstraction engine 410. The term "relational" may refer to, for example, a collection of data items organized as a set of formally described tables from which data can be accessed. Moreover, a Relational Database Management System ("RDBMS") may be used in connection with any of the database tables described herein. According to some embodiments, a graphical administrator interface may provide an ability to access and/or modify the metadata repository and/or the abstraction engine 410. The administrator interface might, for example, let an administrator define map terms, generate reports, etc.

Although a single abstraction engine 410 is shown in FIG. 4, any number of such devices may be included. Moreover, various devices described herein might be combined according to embodiments of the present invention. For example, in some embodiments, the abstraction engine 410 and metadata repository might be co-located and/or may comprise a single apparatus.

Figure 5:
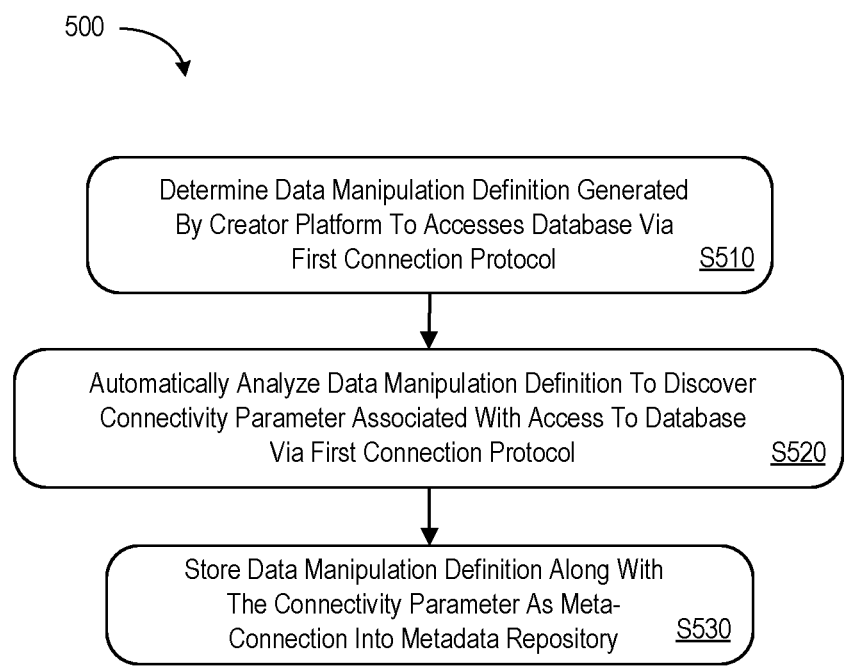
FIG. 5 illustrates an abstraction method according to some embodiments.

FIG. 5 illustrates a method 500 that might be performed by some or all of the elements of the system 400 described with respect to FIG. 4, or any other system, according to some embodiments of the present invention. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At S510, the system may determine a data manipulation definition generated by a creator platform to accesses a database via a first connection protocol. Note that the data manipulation definition might be adapted to be translated into SQL upon utilization (e.g., "on-the-fly"). Moreover, the first connection protocol might be associated with ODBC, JDBC, etc.

At S520, the system may automatically analyze the data manipulation definition to discover a connectivity parameter associated with the access to the database via the first connection protocol. Note that more than one connectivity parameter might be discovered including, for example, a DSN, a DBMS type, a DBMS host name, a port, etc. At S530, the system may store the data manipulation definition along with the connectivity parameter as a meta-connection into a metadata repository.

Figure 6:
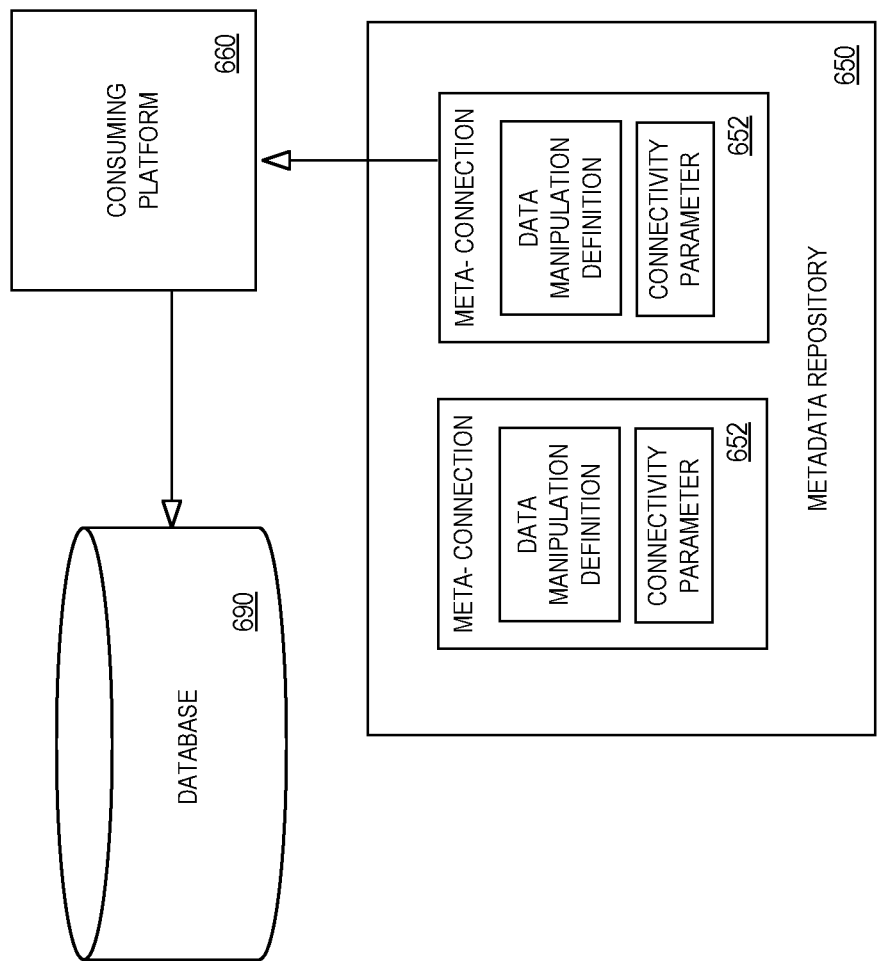
FIG. 6 is a high-level diagram of a system to utilize an abstracted data manipulation in accordance with some embodiments.

The meta-connection may then be consumed by consuming platform (e.g., the access the database via a different connection protocol. For example, FIG. 6 is a high-level diagram of a system 600 to utilize an abstracted data manipulation in accordance with some embodiments. As before, a metadata repository 650 may store meta-connections, and each meta-connection 552 might, for example, include a data manipulation definition along with one or more needed connectivity parameters. A consuming platform 660 may, according to some embodiments, retrieve a meta-connection 652 from the metadata repository 650 and use it to access information in a database 690. Note that an abstraction engine and/or the consuming platform 660 might be associated with automated analytics, expert analytics, legacy automated analytics, an automated analytics kernel, an automated analytics server, a predictive factory, etc.

Figure 7:
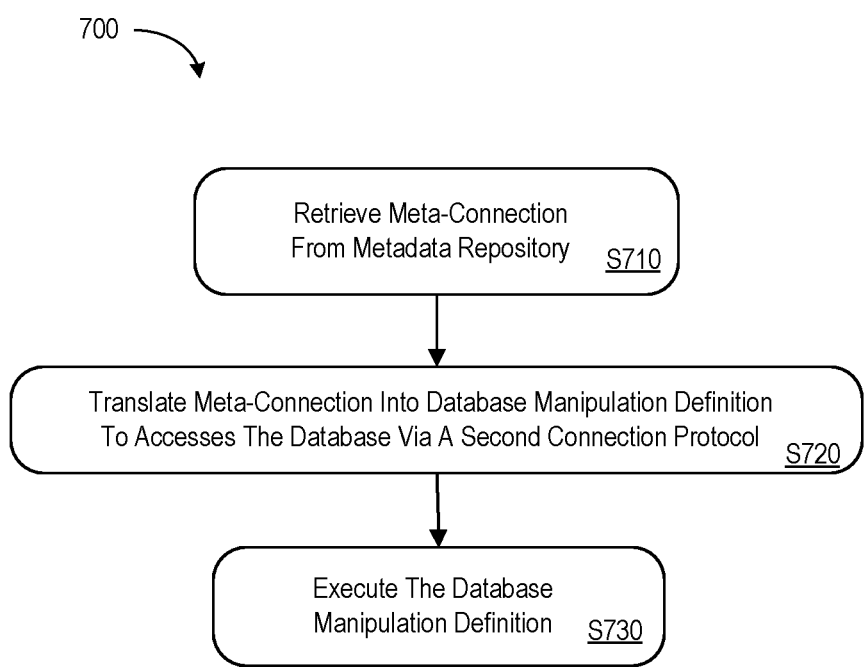
FIG. 7 illustrates method of using an abstracted data manipulation according to some embodiments.

FIG. 7 illustrates method 700 of using an abstracted data manipulation according to some embodiments. The method 700 might be performed, for example, by the consuming platform 660 of FIG. 6. At S710, the system may retrieve a meta-connection from a metadata repository. At S720, the system may translate the meta-connection into the database manipulation definition to accesses the database via a second connection protocol. The consuming platform may then execute the database manipulation definition at S730 to access information in the database using the second connection protocol.

Figure 8:
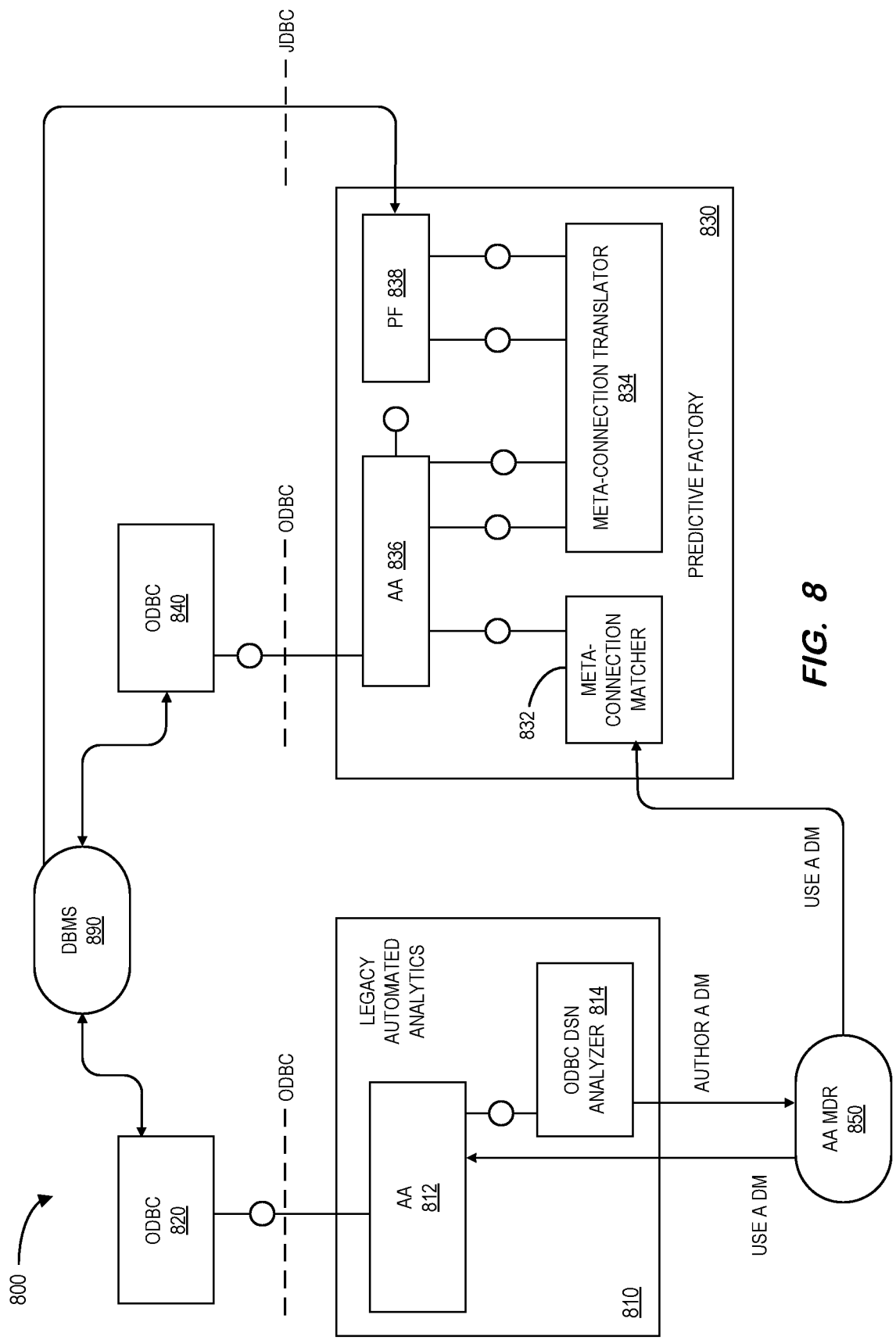
FIG. 8 is a simplified view of one solution in accordance with some embodiments.

FIG. 8 is a simplified view of one solution 800 in accordance with some embodiments. The solution 800 includes legacy automated analytics 810 (including automated analytics 812 and an ODBC DSN analyzer 814) that may author a data manipulation and store it into an automated analytics metadata repository 850. The legacy automated analytics may access a DBMS 890 via ODBC 820. A predictive factory 830 (including a meta-connection matcher 832, a meta-connection translator 834, automated analytics 836, and a predictive factory 838) may also access the DBMS 890 via ODBC 840 and/or JDBC. Note that a data manipulation created using one database technology cannot be consumed by software that does not use the same database technology. That is, different software may use distinct database connectivity technologies (e.g., ODBC v. JDBC). As a result, when sharing the metadata repository 850 to different platforms, the data manipulation's connection information stored when the data manipulation was created may not be suitable for the connectivity actually being used by the consuming software rendering the manipulation useless.

Consider, for example, a data manipulation created by a product using ODBC connectivity. ODBC connectivity typically defines a connection via DSNs (e.g., a string that stores a logical name). These DSNs are usually associated to an ODBC's private set of connection parameters and are defined by an external administration tool. When saved, the data manipulation would save only the opaque DSN.

A consuming software using JDBC connectivity might instead define a connection with a string encoding all connection parameters. As a result, the consuming software cannot consume the data manipulation as connection definitions cannot be matched. To avoid this situation, the solution 800 may analyze the current connection. Whatever connectivity is used, the current connection may analyze the data so that essential connectivity parameters (typically DBMS type, DBMS host name, and port) can be discovered. These essential connectivity parameters may also be saved into the metadata repository 850 when the data manipulation is saved. Consuming software may then define their connections via meta-connections (an abstraction of a connection that is translated on the-fly to the appropriate connectivity). These meta-connections may explicitly list the essential connectivity parameters, and, as a result, the consuming software may be able to match the essential connectivity parameters of the connection used at creation time and at consuming time (and let a user consume data manipulations regardless of which database connectivity is used)

Figure 9:
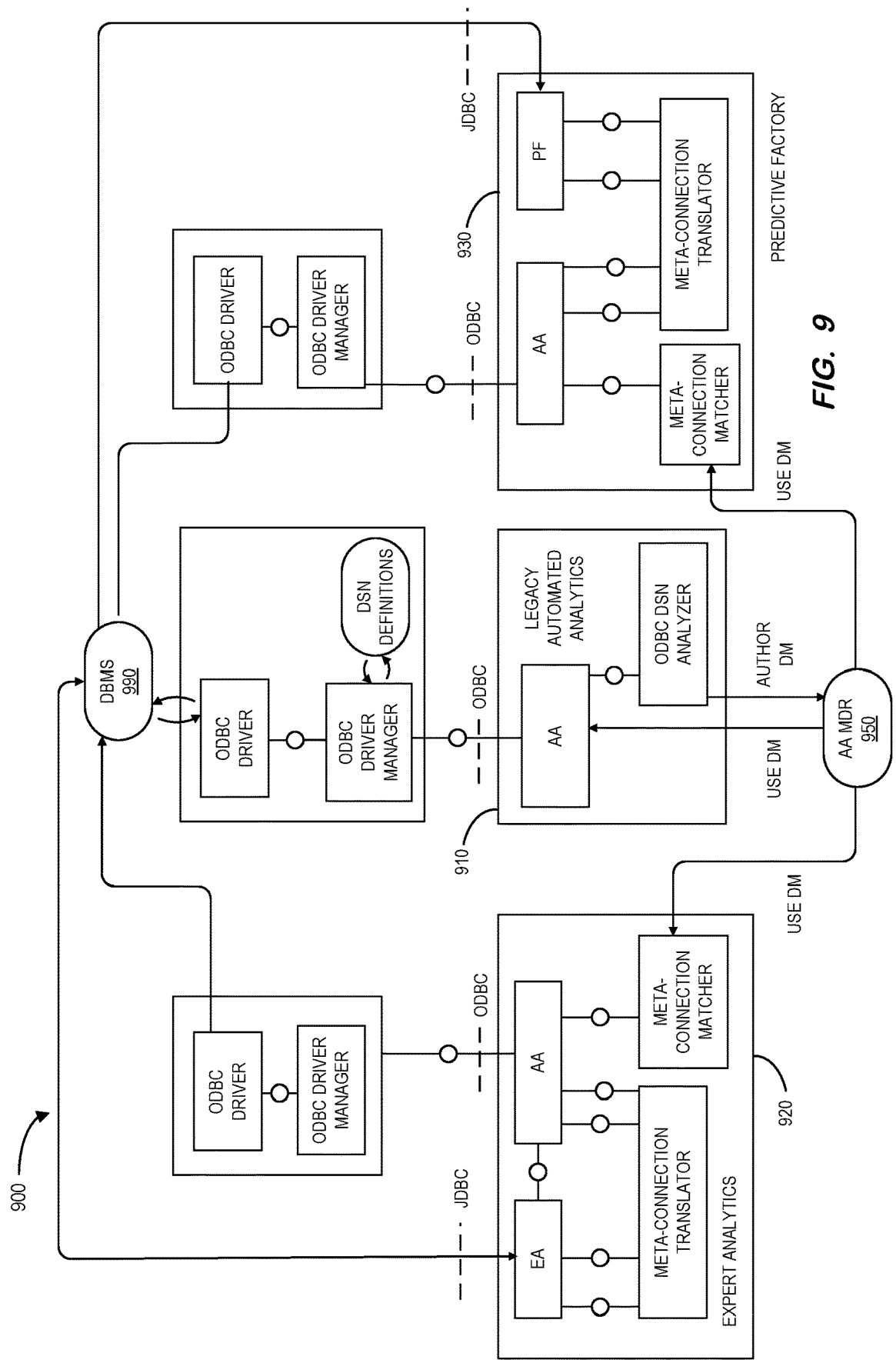
FIG. 9 is a detailed block diagram of a system according to some embodiments.

FIG. 9 is a detailed block diagram of a system 900 according to some embodiments. The system 900 includes legacy automated analytics 910 (including automated analytics and an ODBC analyzer) that authors data manipulations and stores them in an automated analytics metadata repository 950. The data manipulations might access a DBMS 990 via an ODBC driver, ODBC driver manager, DSN definitions, etc. According to some embodiments, the legacy automated analytics 910 might be implemented as a standalone or server installation of automated analytics. For example, the legacy automated analytics 910 might be used to train models not supported by the predictive factory and to author data manipulations. The automated analytics metadata repository 950 might comprise the element where automated analytics stores objects (e.g., data manipulations).

The solution 900 also includes expert analytics 920 (including expert analytics, automated analytics, a meta-connection translator, and a meta-connection matcher) and a predictive factory 903 (including the predictive factory, automated analytics, a meta-connection translator, and a meta-connection matcher). Note that the automated analytics may access the DBMS 990 via an ODBC driver and ODBC driver manager while the expert analytics and factory may access the DBMS 9990 via JDBC. The expert analytics 920 might comprise a standalone workbench that can chain data preparation nodes and data mining nodes (and relevant automated analytics data manipulations may be available as data preparation nodes). The predictive factory 930 might, according to some embodiments schedule trainings and scoring. Moreover, the predictive factory 930 may drive an automated analytics server and relevant automated analytics data manipulations may be proposed as input data. According to some embodiments, each meta-connection translator may translate a meta-connection into an ODBC DSN-less connection string or a JDBC connection string (and may be specific to a DBMS). Each meta-connection matcher may check if important parameters of two meta-connection strings are the same and may be used to filter automated analytics data manipulations by the DBMS they are actually targeting (and may be specific to a DBMS).

Note that the predictive factory 930 and expert analytics 920 may need to directly access the same DBMS as the ones directly accessed by its associated automated analytics servers. Moreover, expert analytics 920 might need to list and reuse automated analytics data manipulations relevant to the DBMS connection. Further, legacy automated analytics 910 may still be used to author data manipulations (e.g., complex queries) that are stored in the private metadata repository 950.

According to some embodiments, the meta-connection matcher component depends on the actual DBMS because, even if ODBC connection string and JDBC connections string are similar, they may be different depending on the DBMS 990, driver provider, and connectivity. For example, JDBC may manage an InstanceNumber connection parameter, letting it avoid explicitly setting up the port number. In contrast, InstanceNumber is not available in ODBC (the port number is mandatory and explicit in ODBC). An example of meta-connection string for a single tenant system might be:

HANA://{Servernode=mo-7726134a4.mo.sap.corp:30015} while an example of a meta-connection string for a multi-tenant system might be:

HANA://
{Servernode=DEWDFLHANA1448.EMEA.GLOBAL.CORPSAa
P:30013;DATABASENAME=TENANT1}

Some embodiments described herein may solve ODBC data manipulation/connectivity parameters association issues. Note that one of the objectives for expert analytics 920 and/or predictive factory 930 may be to list and use only the automated analytics data manipulations that target the current DBMS 990 (note that data manipulations may be authored by legacy automated analytics 910 using standard ODBC DSNs, so challenge is to: (1) introspect a DSN to find its technical parameters, and (2) find the best way/moment to associate a data manipulation with its technical connectivity parameters.

Figure 10:
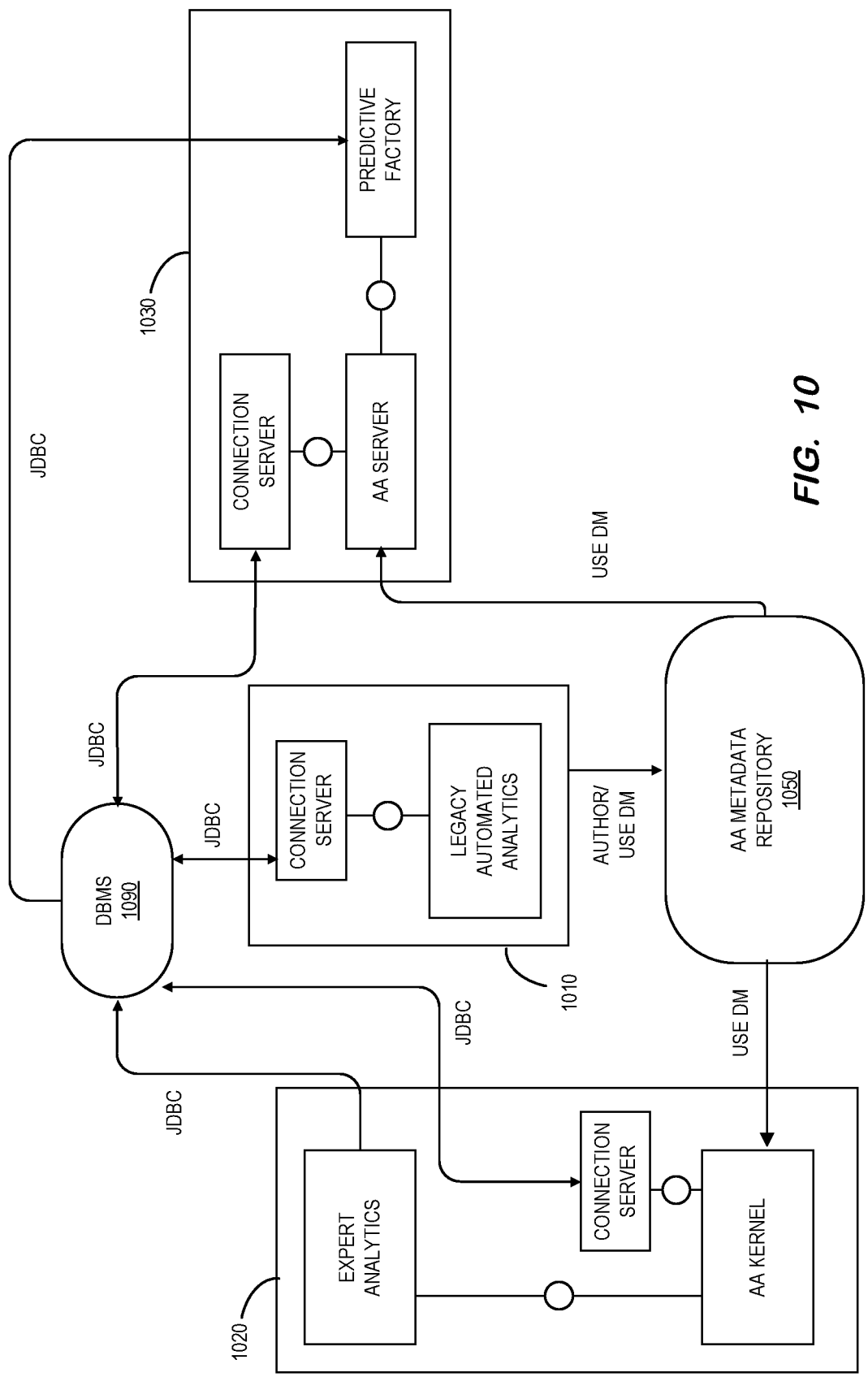
FIG. 10 illustrates another solution in accordance with some embodiments.

FIG. 10 illustrates another solution 1000 in accordance with some embodiments (e.g., providing one connectivity for all elements). An automated analytics metadata repository 1050 may store data manipulations and meta-connections authored by legacy automated analytics 1010 (including a connection server). These may then be used by expert analytics 1020 (including a connection server and automated analytics kernel) and a predictive factory 1030 (including a connection server and automated analytics server) to access a BDMS 1090. According to some embodiments, in automated analytics the connectivity layer may also manage some SQL query generation. Changing the connectivity may require first clearly separating the connectivity from the SQL generation.

According to some embodiments, abstraction of a specification of a connection and translation may be provided as follows. Note that describing a DBMS 1090 connection is a well-known process. Whatever the technology, the same set of main technical parameters must be provided (hostname, protocol, user, password, etc.). In some cases, other specific parameters might be needed depending on the actual DBMS 1090 (authentication mechanism, charset, default schema, etc.). As a result, embodiments may abstract the concept of connection parameters so the system is connectivity agnostic. Moreover, when needed, the system may translate the abstraction to a current connectivity dialect. According to some embodiments, ODBC (as it is used by automated analytics) and JDBC may manage the definition of the DBMS 1090 connections in two different ways:

(1) an ODBC connection may be fully described by a logical DSN which is associated to a set of technical parameters. Management of the association may be done in an opaque way by an external component (e.g., an ODBC driver manager).

(2) JDBC may use a connection string (and the full set of connection parameters ({<Key>=<Value>}) may be encoded in the connection string). Note that the JDBC connection string may be self-sufficient to describe the actual connection.

Figure 11:
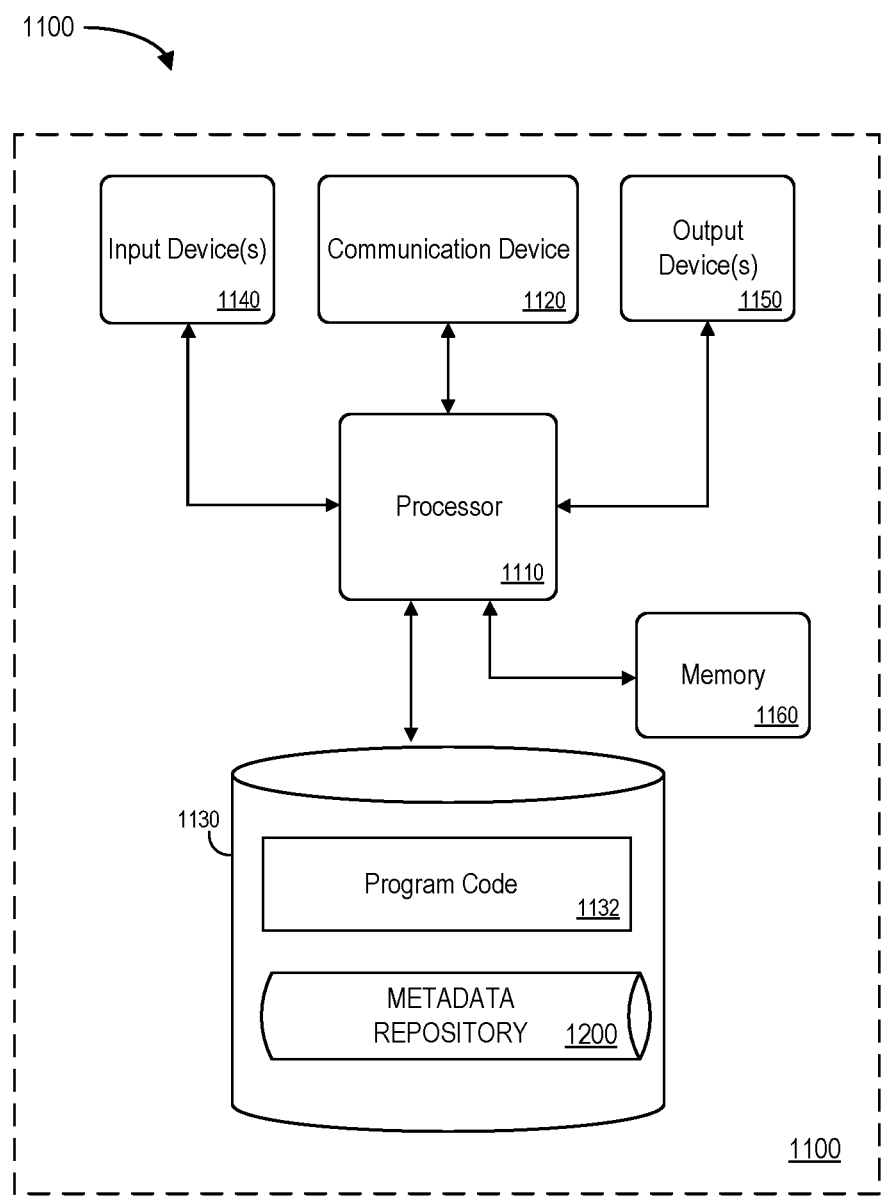
FIG. 11 is a high-level diagram of an apparatus or platform in accordance with some embodiments.

FIG. 11 is a block diagram of apparatus 1100 according to some embodiments. The apparatus 1100 may comprise a general-purpose computing apparatus and may execute program code to perform any of the functions described herein. The apparatus 1100 may include other unshown elements according to some embodiments. According to some embodiments, the apparatus 1100 includes a processor 1110 operatively coupled to a communication device 1120, a data storage device 1130, one or more input devices 1140, one or more output devices 1150, and/or a memory 1160. The communication device 1120 may facilitate communication with external devices, such as a reporting client, or a data storage device. The input device(s) 1140 may comprise, for example, a keyboard, a keypad, a mouse or other pointing device, a microphone, knob or a switch, an Infra-Red ("IR") device, a docking station, and/or a touch screen. The input device(s) 1140 may be used, for example, to enter information into the apparatus 1100 (e.g., a search term used to locate a BIL macro). The output device(s) 1150 may comprise, for example, a display (e.g., a display screen) a speaker, and/or a printer (e.g., to provide data manipulation results to a user, summary reports, troubleshooting information, etc.).

The data storage device 1130 may comprise any appropriate persistent storage device, including combinations of magnetic storage devices (e.g., magnetic tape, hard disk drives and flash memory), optical storage devices, Read Only Memory ("ROM") devices, etc., while the memory 1160 may comprise Random Access Memory ("RAM").

The program code 1132 may be executed by the processor 1110 to cause the apparatus 1100 to perform any one or more of the processes described herein. Embodiments are not limited to execution of these processes by a single apparatus. The data storage device 1130 may also store data and other program code for providing additional functionality and/or which are necessary for operation thereof, such as device drivers, Operating System ("OS") files, etc.

In some embodiments (such as shown in FIG. 11, the storage device 1130 further stores the metadata repository

1200. An example of a database that may be used in connection with the apparatus 1100 will now be described in detail with respect to FIG. 12. Note that the database described herein is only one example, and additional and/or different information may be stored therein. Moreover, various databases might be split or combined in accordance with any of the embodiments described herein.

Figure 12:
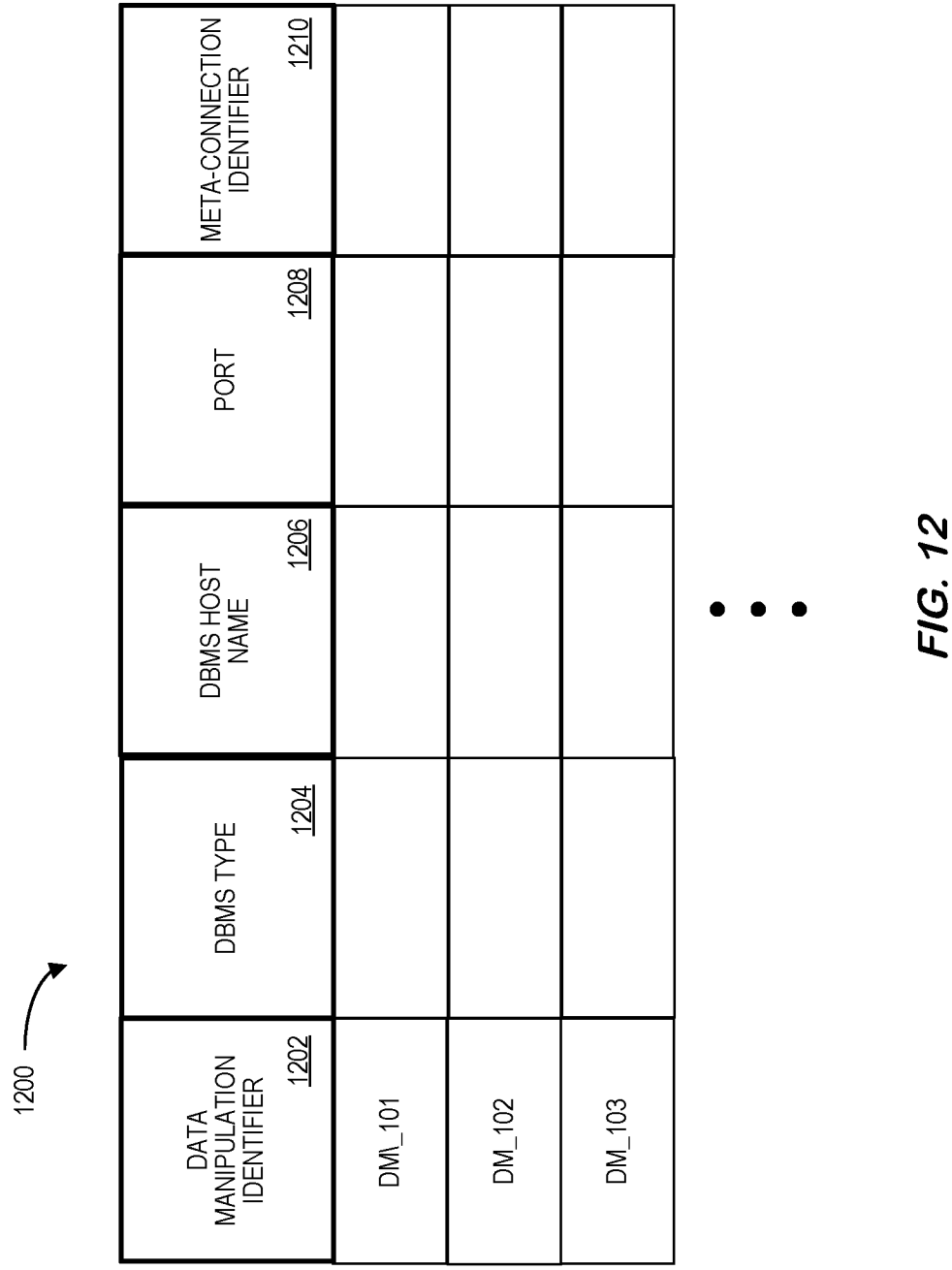
FIG. 12 is a portion of a tabular metadata repository database according to some embodiments.

Referring to FIG. 12, a table is shown that represents the metadata repository 1200 that may be stored at the apparatus 11100 according to some embodiments. The table may include, for example, entries identifying complex queries that may be translated on-the-fly to SQL. The table may also define fields 1202, 1204, 1206 for each of the entries. The fields 1202, 1204, 1206, 1208, 1210 may, according to some embodiments, specify: a data manipulation identifier 1202, a DBMS type 1204, a DBMS host name 1206, a port 1208, and a meta-connection identifier 1210. The metadata repository 1200 may be created and updated, for example, based on information received from automated analytics.

The data manipulation identifier 1202 may be, for example, a unique alphanumeric code identifying a complex query that accesses a database. The DBMS type 1204, DBMS host name 1206, and port 1208 may be essential connectivity parameters associated with that data manipulation. The meta-connection identifier 1210 might indicate an abstracted version of the data manipulation (e.g., that can be consumed by connectivity agnostic software).

Figure 13:
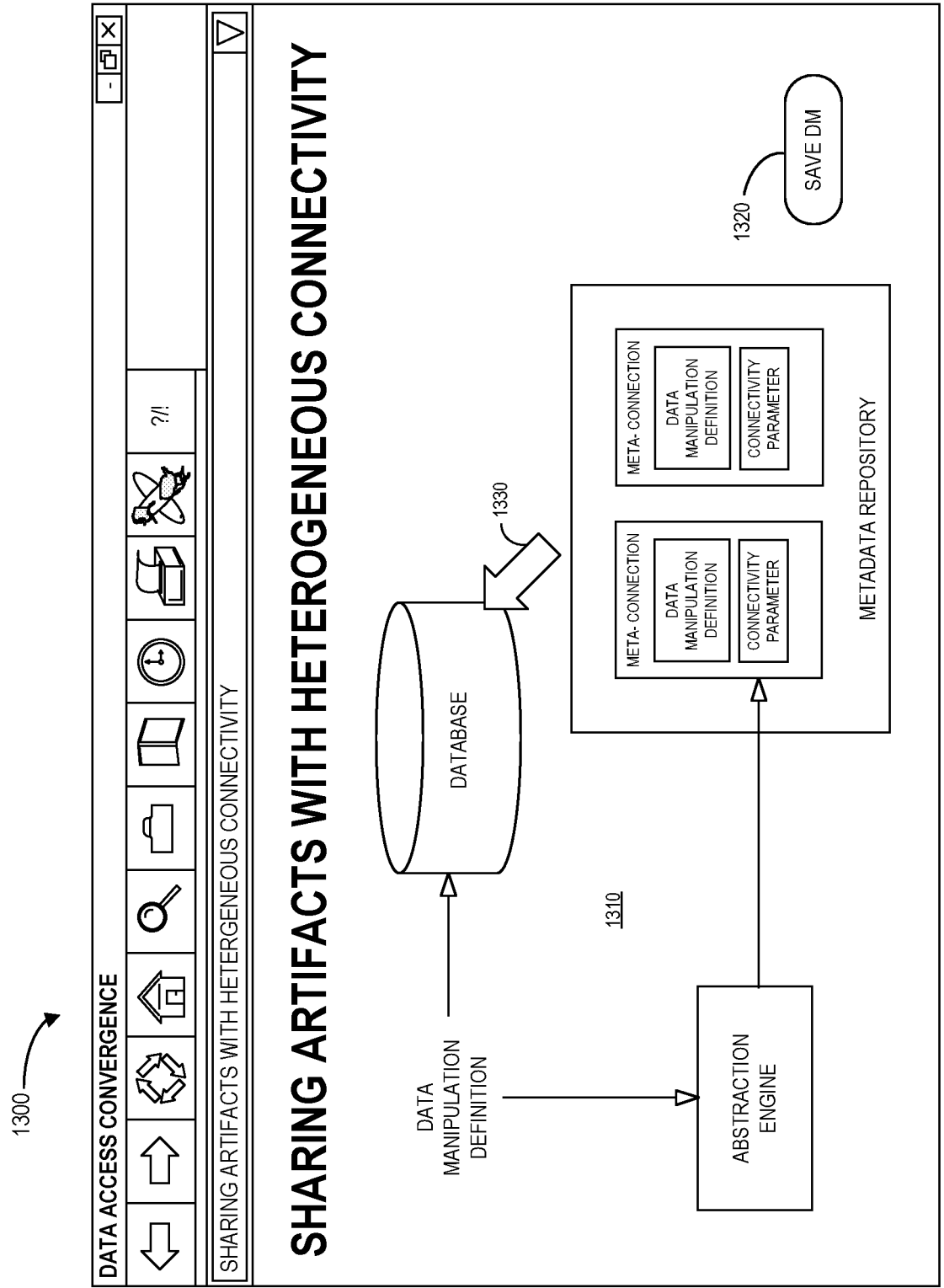
FIG. 13 illustrates an interactive user interface display according to some embodiments.

FIG. 13 illustrates an interactive user interface display 1300 according to some embodiments. The display 1300 includes a graphical representation 1310 of elements of system that permits a sharing of artifacts (e.g., data manipulations) with heterogeneous connectivity. Selection of an element on the display 1300 (e.g., via a computer mouse pointer 1330 or touchscreen) may result in a pop-window providing more information about that element and/or allow a user to adjust parameters associated with that element. Moreover, the display 1300 may include user-selectable icons to save a data manipulation (e.g., as a meta-connection), author a data manipulation, re-used a previously defined data manipulation, etc.

Thus, embodiments may provide several advantages, such as letting data manipulations be shared regardless of the connectivity that is actually used. Moreover, the system may deploy a new connectivity (or updating an existing connectivity) without needing to update connection definitions involved in a data manipulation. The publish mechanism of essential connectivity parameters may let the system easily deploy data manipulations from test servers to production servers (for example, publishing to a production server may be done by updating only the connectivity parameters whereas, previously, an explicit transfer of data manipulations may have been required).

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of the discussed architectures may include a processor to execute program code such that the computing device operates as described herein.

All systems and processes discussed herein may be embodied in program code stored on one or more non-transitory tangible computer-readable media. Such media may include, for example, a floppy disk, a CD-ROM, a DVD-ROM, a Flash drive, magnetic tape, and solid-state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system to share artifacts with heterogeneous database connectivity, comprising:
   (a) a metadata repository storing electronic records;
   (b) an abstraction engine including a computer processor configured to:
      (i) determine a data manipulation definition generated by a creator platform to accesses a database via a first connection protocol,
      (ii) automatically analyze the data manipulation definition to discover a connectivity parameter associated with the access to the database via the first connection protocol, and
      (iii) store the data manipulation definition along with the connectivity parameter as a meta-connection into the electronic records of the metadata repository, and
   (c) a consuming platform adapted to:
      (iv) retrieve the meta-connection from the metadata repository, and
      (v) translate the meta-connection into the database manipulation definition to accesses the database via a second connection protocol;
   wherein the system is associated with: (i) an automated analytics kernel, (ii) an automated analytics server, and (iii) a predictive factory.

2. The system of claim 1, wherein the data manipulation definition is to be translated into Structured Query Language ("SQL") upon utilization.

3. The system of claim 1, wherein the first connection protocol is associated with at least one of Open Database Connectivity ("ODBC"), and (ii) Java Database Connectivity ("JDBC").

4. The system of claim 1, wherein a plurality of connectivity parameters are discovered and stored as the meta-connection.

5. The system of claim 4, wherein the plurality of parameters include at least one of: (i) a Data Source Name ("DSN"), (ii) a Database Management System ("DBMS") type, (iii) a DBMS host name, and (iv) a port.

6. The system of claim 1, wherein the consuming platform is further adapted to:
   (vi) execute the database manipulation definition.

7. A computer-implemented method for a system to share artifacts with heterogeneous database connectivity, comprising:
   determining, by a computer processor of an abstraction engine, a data manipulation definition generated by a creator platform to accesses a database via a first connection protocol;
   automatically analyzing, by the computer processor, the data manipulation definition to discover a connectivity parameter associated with the access to the database via the first connection protocol;

storing the data manipulation definition along with the connectivity parameter as a meta-connection into a metadata repository;

retrieving, by a consuming platform, the meta-connection from the metadata repository; and translating, by the consuming platform, the meta-connection into the database manipulation definition to accesses the database via a second connection protocol, wherein the system is associated with: (i) an automated analytics kernel, (ii) an automated analytics server, and (iii) a predictive factory.

8. The method of claim 7, wherein the data manipulation definition is to be translated into Structured Query Language ("SQL") upon utilization.

9. The method of claim 7, wherein the first connection protocol is associated with at least one of Open Database Connectivity ("ODBC"), and (ii) Java Database Connectivity ("JDBC").

10. The method of claim 7, wherein a plurality of connectivity parameters are discovered and stored as the meta-connection.

11. The method of claim 10, wherein the plurality of parameters include at least one of: (i) a Data Source Name ("DSN"), (ii) a Database Management System ("DBMS") type, (iii) a DBMS host name, and (iv) a port.

12. The method of claim 7, further comprising:

executing, by the consuming platform, the database manipulation definition.

13. A non-transitory, computer-readable medium storing program code, the program code executable by a computer processor to cause the processor to perform a method for a system to share artifacts with heterogeneous database connectivity, the method comprising:

determining a data manipulation definition generated by a creator platform to accesses a database via Open Database Connectivity ("ODBC");

automatically analyzing the data manipulation definition to discover a Database Management System ("DBMS") type, a DBMS host name, and a port associated with the access to the database via ODBC;

storing the data manipulation definition along with the DBMS type, the DBMS host name, and the port as a meta-connection into a metadata repository, wherein a consuming platform is to retrieve the meta-connection from the metadata repository and translate the meta-connection into the database manipulation definition to accesses the database via a connection protocol other than ODBC, and wherein the system is associated with: (i) an automated analytics kernel, (ii) an automated analytics server, and (iii) a predictive factory.

14. The medium of claim 13, wherein the data manipulation definition is to be translated into Structured Query Language ("SQL") upon utilization.

15. The medium of claim 13, wherein the system is further associated with at least one of: (i) automated analytics, (ii) expert analytics, or (iii) legacy automated analytics.

* * * * *